3 Sheets—Sheet 1.

M. E. KNIGHT,

Assignor, by mesne assignments, to THE EASTERN PAPER-BAG CO.

Paper-Bag Machine.

No. 9,202. Reissued May 18, 1880.

Witnesses.
S. F. Connor
V. D. Dearborn

Inventor.
Margaret E. Knight
by Crosby & Gregory
Attys

3 Sheets—Sheet 2.

M. E. KNIGHT,

Assignor, by mesne assignments, to THE EASTERN PAPER-BAG CO.

Paper-Bag Machine.

No. 9,202. Reissued May 18, 1880.

Witnesses
L. F. Connor
J. [illegible]

Inventor
Margaret E. Knight
by Crosby & Gregory
Attys

3 Sheets—Sheet 3.

M. E. KNIGHT,

Assignor, by mesne assignments, to THE EASTERN PAPER-BAG CO.

Paper-Bag Machine.

No. 9,202. Reissued May 18, 1880.

Witnesses.
L. F. Connor.
V. D. Dearborn

Inventor
Margaret E. Knight
by Crosby & Gregory
Attys

UNITED STATES PATENT OFFICE.

MARGARET E. KNIGHT, OF SPRINGFIELD, MASSACHUSETTS, ASSIGNOR, BY MESNE ASSIGNMENTS, TO THE EASTERN PAPER BAG COMPANY, OF HARTFORD, CONNECTICUT.

PAPER-BAG MACHINE.

SPECIFICATION forming part of Reissued Letters Patent No. 9,202, dated May 18, 1880.

Original No. 116,842, dated July 11, 1871. Application for reissue filed March 5, 1880.

*To all whom it may concern:*

Be it known that I, MARGARET E. KNIGHT, formerly of Boston, in the county of Suffolk and State of Massachusetts, but now of Springfield, in the county of Hampden and State of Massachusetts, have invented a new and Improved Machine for Making Paper Bags; and I hereby declare the following to be a full and correct description of the same, reference being had to the accompanying drawings.

Figure 1:
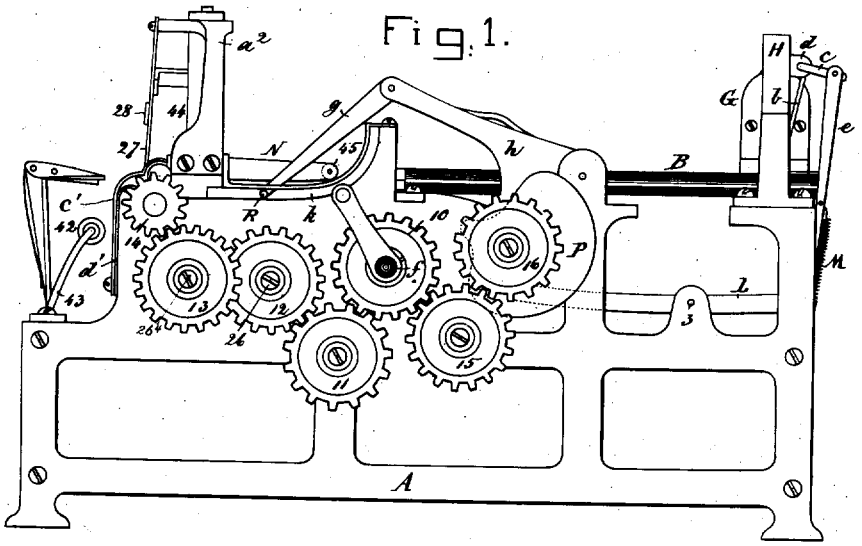
Figure 2:
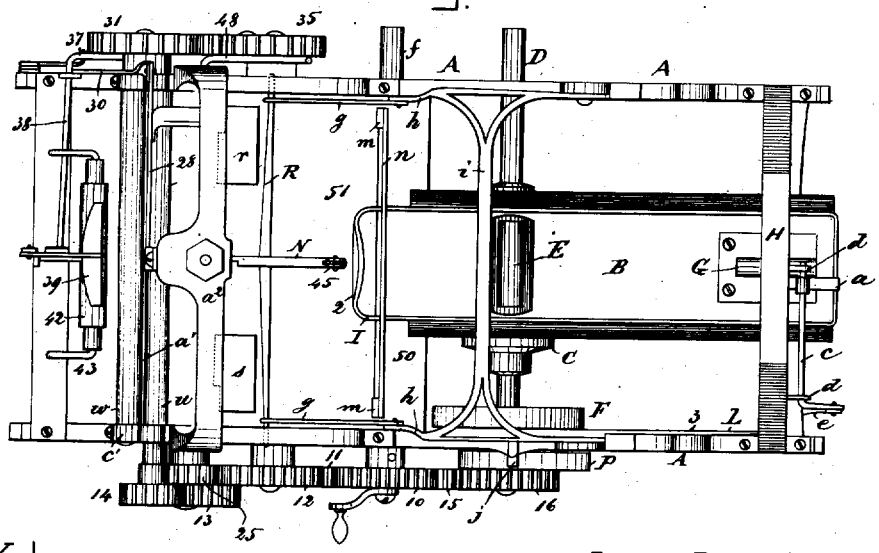
Figure 3:
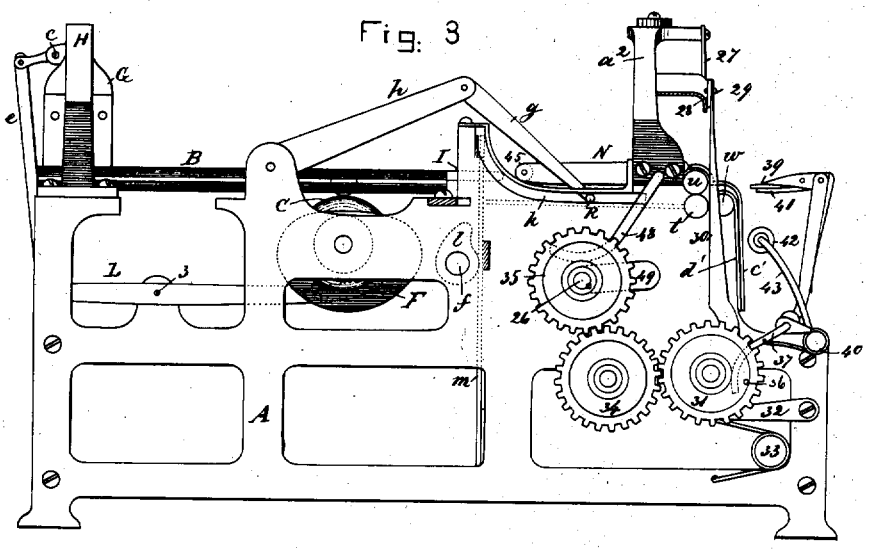
Figure 4:
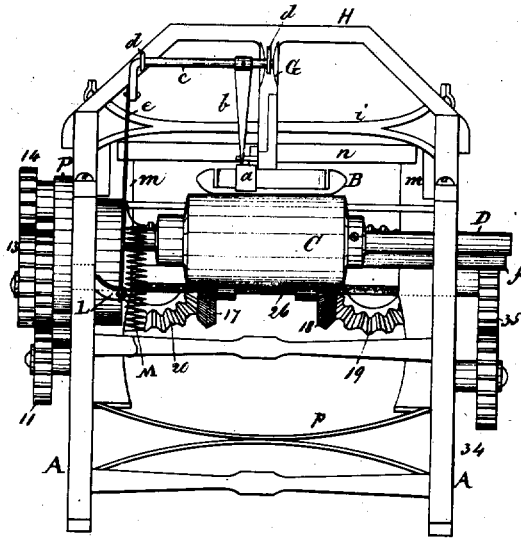
Figure 5:
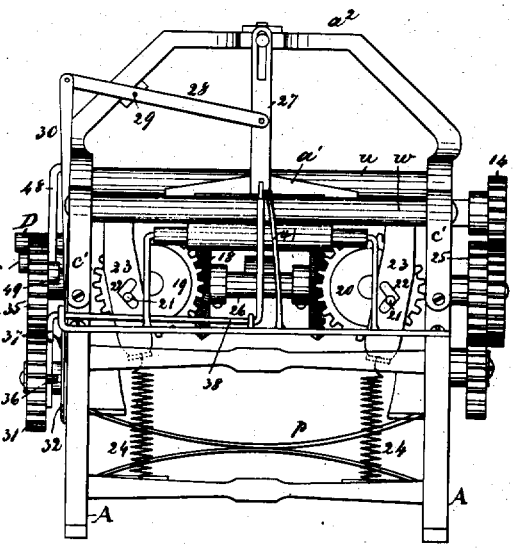
Figure 6:
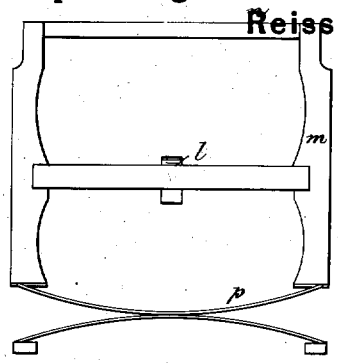
Figure 7:
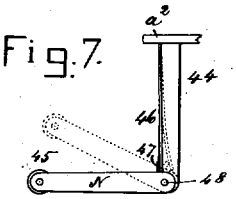
Figure 9:
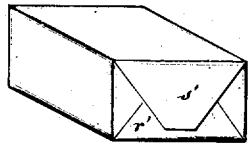
Figure 8:
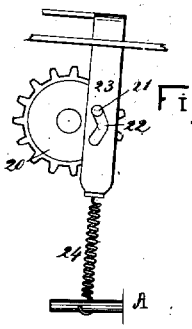
Figure 10:
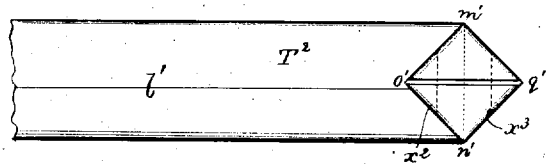
Figure 11:
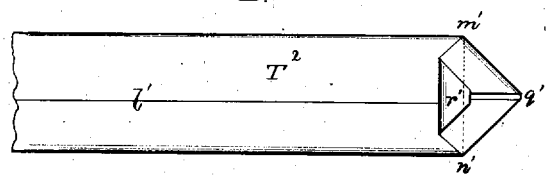
Figure 12:
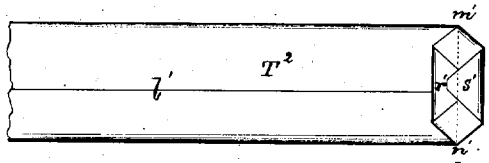

Figure 1 represents, in side elevation, a paper-bag-making machine containing my improvements; Fig. 2, a plan or top view thereof. Fig. 3 represents, in elevation, the opposite side of the machine; Fig. 4, an end view thereof, taken from the feeding end of the machine; Fig. 5, a view of the bag-delivery end of the machine; Fig. 6, a detail of the tube-severing knife or cutter and its frame; Fig. 7, a detail side view of the finger, showing it in two of its positions; Fig. 8, a detail of one of the side-folders and its operating parts; Fig. 9, a perspective view of the bottom of a bag, such as the machine herein described will make from a web of paper; and Figs. 10, 11, and 12 show, respectively, the successive folds made in the tube to form the flat or satchel bottom, viz: the diamond and first and second cross-folds.

Prior to this my invention it has been customary to automatically form a web of paper into a tube and sever it transversely with one ply longer and so as to lap over and be automatically pasted to the other ply to form the bag-bottom, and so, also, it was customary to hold a paper tube clamped near its end and by hand fold it to form a diamond fold, and then to make cross-folds and complete the flat bottom for the bag; but, prior to my invention, I am not aware that a machine was ever devised to first fold a web of paper into a tube and then, by the continuous operation of the machine, so operate upon the leading end of the tube carried automatically forward as to form the diamond fold, which is the basis of the flat-bottomed bag.

In this my improved machine a continuous web of paper is folded about a former to make a tube. The tube is fed forward over and beyond the end of the former. Its end is opened and laid back to form the diamond fold, after which a length of the tube is cut sufficient for a bag, and the diamond-folded end of the piece of tube so cut off is then folded transversely and pasted in the form required to produce a satchel-bottom bag.

My invention in satchel-bottom-bag machinery consists, essentially, in a novel device, denominated by me as the "finger," the purpose and aim of which are to enter the open end of or act upon one ply of the paper tube, lay it back upon itself, and form the diamond fold, which is the foundation fold in the manufacture of a flat or satchel bottom bag.

My invention also consists in the combination, with feeding mechanism to move the tube forward, of a finger to enter the open end of the tube as it is being fed forward, and, by its action within the tube upon one ply thereof, lay it back in opposition to the direction of movement of the tube by the feeding mechanism, thus forming the diamond fold.

My invention also consists in the combination, with the paper-tube-feeding mechanism and the finger to act upon one ply of the paper within its open or leading end, of a transverse blade or folder, one purpose of which is to insure a straight transverse fold in but one ply of the said tube and determine the line or direction of said fold as that ply is turned outward and back by the said finger within the tube during the operation of forming the diamond fold.

My invention also consists in the combination, with the former about which the web of paper travels, of a follower which projects beyond the front end of the former and keeps the two plies of the tube separated, so that the leading end of the tube may be readily entered to permit one ply of it to be raised in the formation of the diamond fold; also, in the combination, with a finger to enter the open end of, and act upon one ply of, a paper tube, and lay it back during the formation of the diamond fold, of a blade and a pair of rolls, the blade being made to descend upon one end of the diamond fold, crease it transversely, and force it into the bight of the said rolls, which carry the bag away between them; also, in other features enumerated and claimed at the end of this specification.

A marks the frame of the machine, of suitable shape to sustain the operative parts. The web of paper (of indefinite length) from which the bags are to be made, is drawn from a roll so suspended as to be unwound and supplied to the machine as fast as required. This web is folded about a former, B, with the lap upon the upper side. The pasting, which makes it a continuous tube, is effected by suitable devices for that purpose; but such devices being well known are not herein shown.

The larger feed-wheel C on the shaft D cooperates with the small roller E, located in a recess in the former B, draws the web of paper from the roll, and, as the latter is made into a tube about the former, feeds the tube forward to the devices which, as the tube is so moved, act to form the diamond fold.

The former, made as an oblong trunk, attached by bracket G to the gallows H, at the rear end of the frame, is grooved to receive the follower I, shown as an oblong metal frame extended at front beyond the former B, and of sufficient thickness at its forward end, 2, to keep separated at its leading end the plies of paper forming the tube, to thereby permit the entrance therein of the finger N, to be hereinafter described. This follower has a projection, *a*, which is engaged by the arm *b* of a rock-shaft, *c*, supported in bearings *d*. This rock-shaft is joined by link *e* with the lever L, pivoted at 3, and the lever, acted upon at the proper time by the cam F on the shaft D, moves the follower forward, while the spring M moves it backward to enable the tube to be cut off.

Mounted loosely on the shaft D, and deriving its motion from gear 16, is the cam P, suitably shaped to operate the plate-knife folder or blade R. This blade, which extends across the machine above the paper tube, is carried at the end of arms *g*, jointed to pivoted arms *h*, connected by a brace, *i*. The said blade is operated at the proper times by the cam P acting upon the pin *j*, projecting from the arm *h*. (See Fig. 2.)

The outer ends of the blade R rest and move in a curved guideway, *k*, (see Figs. 1 and 3,) which so directs the said blade as to cause it when operated to move downward and forward and then backward and upward, it, during its forward movement, traveling at substantially the velocity of the tube-feeding mechanism.

As the finger turns one ply of the tube back this blade acts upon the opposite face of the said ply and determines the line of the transverse fold in it and the line of cross-fold at the center of the diamond fold.

Power to drive the machine is applied to the shaft *f*, provided with a gear, 10, which sets in motion the train of gear 11 12 13 14 and the train 15 16 for operating the different parts. The train 15 16 moves the cam P. The gears 11 12 set in motion the cam-shaft 26.

The shaft *f* has a cam, *l*, (see Figs. 3, 5, and 6,) which acts upon and depresses the frame *m*, which carries the tube cutting or severing knife or blade *n*. The said frame is lifted at the proper time by the spring *p*.

The shaft 26 has fixed to it two bevel-gears, 17 18, which engage and drive the bevel-gears 19 20, the studs or journals of which are suitably held in brackets at the inside of the framing of the machine. These gears 19 20 have pins 21, which enter angular slots 22 in the arms 23, connected with the clamping and folding plates *r s*.

Spiral springs 24, connected with the arms 23, act to depress the said clamping-plates as the pins 21 travel through the lower half of their movement.

Gear 12 engages and drives the reversing-gear 25, fixed on stud $26^{\times}$, which also carries the fixed gear 13, that drives the pinion 14 on the shaft of the lowermost delivering-roller, *t*, of the set of rollers *t u w*, all moved by the roller *t*. Rollers *u w* are held in their places by spring-guards *c′ d′*.

The cross-folding blade *a′*, to form the second cross-fold in the paper bag on the dotted lines $x^3$, Fig. 10, by descending upon and forcing the same between the rollers *t w*, is attached to the guided rod 27, which is lifted at the proper times by the lever 28, pivoted at 29, the said lever having a link, 30, bent at its lower end under, and so as to be operated by a suitable cam at the inner face of the gear 31.

The link 30, at its lower end, is jointed to the pivoted lever 32, and a spring, 33, below the said lever 32, when the link 30 is released from its operating-cam, acts to lift it and quickly throw down the folding-blade *a′*.

The gear 31 derives its motion from the train of gear 34 35, the latter being fixed at one end of shaft 26.

A pin, 36, at the inner side of gear 31, strikes and operates in one direction the lever 37 and rock-shaft 38, that actuate the pasting mechanism 39, a spring, 40, operating the pasting mechanism in the reverse direction.

The pasting device works over and is directed in its movement by a suitable guide, 41, and is supplied with paste by a roller, 42, on an arm, 43, said roller receiving its paste from a suitable reservoir of paste. (Not shown.)

The arch $a^2$ has a finger-holder, 44, upon which is pivoted the finger N, provided at its front end, as shown, with the roller 45.

A spring, 46, which bears against a pin, 47, of the finger, tends to keep it in horizontal position, or so as to enter the open end of the paper tube to be folded for a bag, and remain within it and lay back one ply thereof as the latter is moved forward by the feeding mechanism. This finger is secured to rod 48, having its end bent, as shown, (see Fig. 3,) and extended over a cam, 49, (see Figs. 3 and 5,) at the inner side of gear 35.

The front edge of plate 50 serves as the lower member of the tube-severing device, the upper member being the knife or blade *n*, before described.

The under ply of the paper tube, while being operated upon to form the diamond fold for the bag bottom, and also while the first cross-fold is made, is sustained upon the tube-supporting plate 51.

The feeding-shaft D, in practice, will be driven intermittingly by means of intermediate gears from an eccentric at one end of the driven shaft *f*, so as to have its motion arrested to stop the forward movement of the paper tube just as the clamping plates or folders *r s* descend upon it, and as the blade *n* severs it to form a bag-length. The devices for producing this intermitting movement of the feeding devices being common are not herein shown.

As the folders are moved back and up from contact with the tube, the diamond fold (see Fig. 10) having been completed, the tube-feeding devices are again permitted to operate.

The follower I starts and moves with the paper tube until it meets the finger, keeping the upper and lower plies of the tube separate for the proper entrance into the leading end of the tube of the finger N, preparatory to holding or pushing back one ply and making the diamond fold, and the finger having entered the tube the follower is drawn back beyond and to the rear of the blade *n*, so as not to be in the way when the tube is being cut. While the finger enters the leading end of the tube the folder-blade R rests upon one ply of the tube—the upper ply back from its open end—and holds down the said ply while the finger acting within the tube turns back one ply of it across the said blade, the latter insuring a straight or right-angled fold of one ply on the line *m′ n′*. (See Figs. 10 to 12.) This blade R, after it is thrown down upon the paper tube in front of the end of the finger, is moved forward at the speed at which the tube is then being moved or fed forward by the feeding devices.

Extending, as described, across the upper ply of the tube, the further movement of the machine causes the blade and finger to so change their relative positions, one with relation to the other, that the said blade passes below the finger, acting against the inner face of the upper ply of the tube being moved forward, as described, lays back the upper ply, forming the diamond fold, (as in Fig. 10,) the finger, as the diamond fold is being completed, passing from the rearmost corner thereof, after which the further movement of the tube so folded carries it under and beyond the finger. During the time the finger is acting against the inner face of the upper ply, as described, the under ply at the leading end of the bag must be held down. This is done in this machine by the finger itself.

The blade R is moved forward until it passes the paper tube, which it engages on the line *m′ n′*, under the clamping plates or folders *r s*, a distance equal to the distance it is desired to have between the lines *m′ n′* and $x^2$, the latter being the line of first cross-fold, the leading point *q′* of the diamond fold at that time being placed between the rolls *t u*. The blade R, or first cross-folder, is then drawn partially back, the clamping plates or folders *r s* close down upon the tube, the feed mechanism is stopped, the tube is cut off, after which the said blade is again moved forward, but this time above the clamping-plates, laying the rearmost end of the diamond fold over upon the clamping-plates, forming the first cross-fold and the corner *r′*, (see Fig. 11,) the finger during this operation being raised, as in dotted lines, Fig. 7, to let the fold of paper pass under it, after which the finger is dropped to hold the said fold or corner in place. The blade R and side folders are then drawn away, and the first half of the bottom of the bag is made. After this the paper is permitted to pass between the rollers *t u*, when the blade *a′* descends and strikes the paper on the line $x^3$, folds and passes the same between the rollers *t w*, making the second cross-fold, turning that corner marked *s′*, and completing the other half of the bag-bottom. Just before making this last fold the bottom was pasted by the pasting devices. The bag-bottom, as well as its entire length, is pressed by its passage between the rollers *t w*.

I wish to have it understood that, believing myself to be the first to invent a device to enter and hold or push back from its inner side a point or portion of one edge or ply of the paper tube in the formation of the diamond fold represented in Fig. 10, which is the basis of the flat-bottomed bag, I do not confine myself to any particular form, position, or mode of attaching the device so referred to, and which I have designated as a finger, nor do I limit myself to making it fixed or movable, as long as it performs the function for which I have devised and used it.

I have made it in various forms, fixed as well as movable, and having a rearward projection like a heel. The finger hereinbefore described I believe to be of the best form; but other forms will answer with the necessary modifications of the accompanying mechanism without altering the principle of operation by which the fold represented in Fig. 10 is made.

The follower extended beyond the end of the former, and narrower than it, obviates all friction on the interior of the tube.

In Figs. 10 to 12, $T^2$ represents the paper tube, and *l′* its lapped and pasted edge.

I claim—

1. In a paper-bag machine, the follower to keep open the leading end of the tube after passing beyond the former, substantially as described.

2. In an organized paper-bag-making machine, the following instrumentalities, viz: the blade to bear upon one side of the paper tube back of its leading end, and the finger to act against one ply of the tube and form a diamond fold at the leading end of the tube, for the purpose set forth.

3. In a paper-bag machine, the former about which the web of paper is held as a tube, and finger to act upon and lay back one ply of the leading end of the tube in the formation of the diamond fold, combined with a reciprocating blade to act upon the outer side of that ply of the paper tube which is laid back by the finger, substantially as described.

4. In a paper-bag-making machine, the following instrumentalities, viz: the blade to bear upon or extend across the tube back of its leading end, the finger to lay back one ply of the tube, and the clamping plates or folders to bear upon and hold the diamond fold centrally, substantially as described.

5. The finger N, or equivalent device, whether fixed or movable, to operate upon the inner side of the tube and hold or push back a portion of the open end of the tube while the diamond fold is being formed.

6. In a paper-bag machine, the finger to act upon or within a part of the leading end of one ply of the tube during the formation of the diamond fold, combined with feeding mechanism adapted to feed the tube forward while the diamond fold is being made.

7. In an organized machine for the manufacture of paper bags, the following instrumentalities, viz: the former about which to form a web of paper into a tube, a finger to operate within the tube at its end to assist in laying one ply of the tube back upon itself, feeding mechanism to move the tube forward during the act of laying the diamond fold, and the blade to rest upon or extend across the tube, to operate in opposition to the finger, substantially as described.

8. The pivoted finger to act upon the interior of the paper tube at its end, combined with means, substantially as described, to move the finger in a vertical plane at right angles to the movement of the paper tube along over the former, substantially as described.

9. In an organized machine for the manufacture of paper bags, the following instrumentalities, viz: the former, follower narrower than the former and extended beyond the end of the former, to keep the upper and lower plies of the tube separated, and finger to act upon one ply of the tube at its leading end and assist in forming the diamond fold therein, substantially as described.

10. The former and finger, combined with the reciprocating follower located within the tube beyond the delivery end of the former, substantially as described.

11. In a paper-bag-making machine, the following instrumentalities, viz: the finger to hold or lay back one ply of the paper tube at its end, combined with the blade to act upon the outer side of the tube back of its leading end during the formation of the diamond fold, and means to reciprocate the said blade to cause the tube to be folded transversely across it to define the usual center fold for the bag-bottom, substantially as described.

12. The tube-supporting bed and the movable blade, combined with the clamping-plates or side-folders, substantially as described.

13. In an organized machine for the manufacture of paper bags, the following instrumentalities, viz: the former about which the tube is held, and finger, blade, and feeding mechanism to form the diamond fold, rollers to act upon the leading end of the diamond fold and deliver the tubular and diamond-folded piece of paper in position to be cross-folded, and blade to make a cross-fold in the diamond fold, substantially as described.

14. In a paper-bag machine, the combination, with the former about which the tube is formed and the finger to assist in laying the diamond fold, as described, of the second cross-folder blade to fold the leading end of the diamond fold transversely, substantially as described.

15. In a paper-bag-making machine, the following instrumentalities, viz: the clamping-plates *r s*, and mechanism, substantially as described, to raise and lower and move the same toward and from the center of the tube or bag, and a reciprocating blade to turn one corner of the diamond fold over upon the clamping-plates while resting upon the diamond fold, substantially as set forth.

16. In an organized machine containing devices to form the diamond fold at the leading end of the tube, the combination, with rollers to engage the leading end of the diamond fold and move the tubular piece of paper forward, of a blade to co-operate with the said rollers and cross-fold the diamond fold as the said tubular piece of paper is being moved continuously forward.

MARGARET E. KNIGHT.

Witnesses:
HENRY A. CHAPIN,
CHARLES O. STEARNS.